Figure 1:
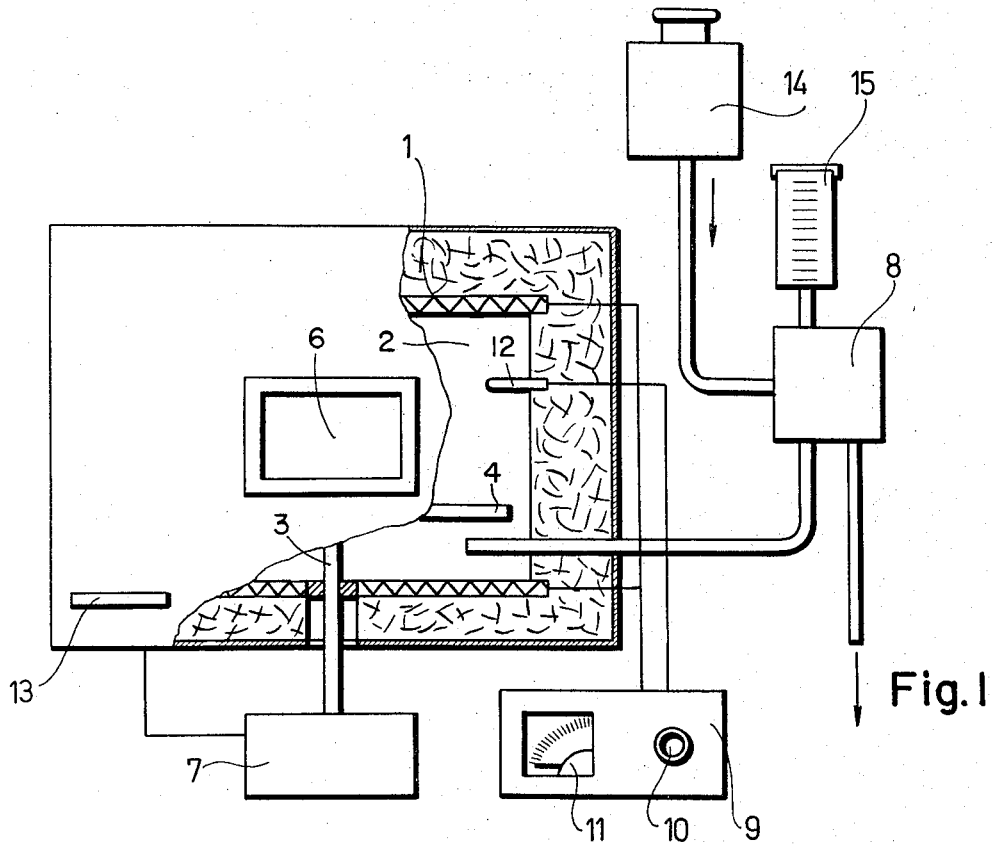
Figure 2:
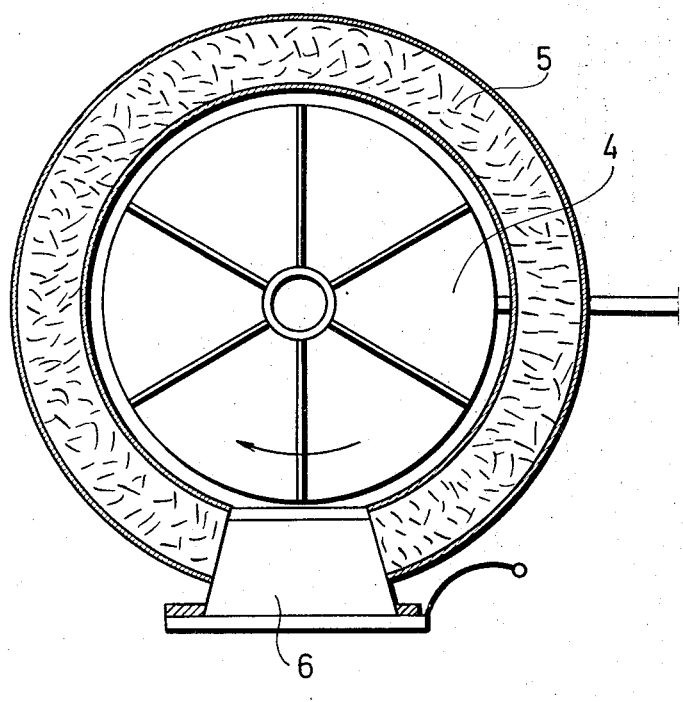

United States Patent [19]
Muranyi et al.

[11] 3,824,066
[45] July 16, 1974

[54] BAKING OVEN

[75] Inventors: Istvan Muranyi; Attila Voros; Janos Varga; Ivan Orosz, all of Budapest, Hungary

[73] Assignee: Labor Mueszeripari Muevek, Esztergom, Hungary

[22] Filed: Sept. 18, 1972

[21] Appl. No.: 289,633

[30] Foreign Application Priority Data
Sept. 16, 1971  Hungary ............................ OE 2251

[52] U.S. Cl. .................... 432/57, 432/37, 432/124, 432/198
[51] Int. Cl. ............................................. F27b 5/04
[58] Field of Search ......... 432/37, 56, 57, 198, 124, 432/237; 110/173

[56] References Cited
UNITED STATES PATENTS
2,091,442  8/1937  Heiman .......................... 110/173 R
2,203,422  6/1940  Strobridge ............................. 34/45
2,986,103  5/1961  Flores ................................ 432/124
3,372,913  3/1968  Gaabs ................................ 432/124
3,678,244  7/1972  Worline ............................. 432/198

FOREIGN PATENTS OR APPLICATIONS
1,356,095  2/1964  France ............................... 432/138

Primary Examiner—John J. Camby
Attorney, Agent, or Firm—Larson, Taylor & Hinds

[57] ABSTRACT

A baking oven for test-baking loaves of bread has a baking chamber heated by a heating element to a desired baking temperature, and a door through which to introduce the loaves. In response to closure of the door, water is passed through a pipe extending from the outside into the baking chamber and is allowed to fall on the heating element for immediate evaporation. The amount of water is metered so as to be sufficient to saturate the air in the baking chamber with water vapor at the baking temperature.

4 Claims, 2 Drawing Figures

BAKING OVEN

This invention concerns baking ovens, and although it is not intended to be so restricted, it will hereinafter be described with reference to ovens used for test-baking purposes.

Test baking is a method suitable for the complex evaluation of the quality of grain or flour, which method is in widespread use by institutes for grain improvement and research. To effect investigations in laboratory conditions, small test baking ovens are employed which are required to satisfy the following criteria:

temperature stability;
uniform heat distribution in the baking space;
maintenance of a saturated water vapor atmosphere to the baking space during baking.

The first two conditions can be regarded as satisfied in known test baking ovens, but they can only bake test samples of 300–1000 g weight. At present there are no ovens known to the applicants as being available for baking samples smaller than that.

In view of the fact that frequently there is a need for the simultaneous examination of grain of many different types and properties, and that there is often only a small amount of test material available to the testing establishment, a reduction in the weight of test loaves is necessary and thus the need arises for ovens enabling the baking of test samples of 50–100 g also. It will be appreciated that reduction in weight causes the samples to be more sensitive to the temperature distribution in the baking space; and this increased sensitivity tends to affect the reproducibility of the test procedure.

The main problem, however, is ensuring a saturated water vapor atmosphere during baking.

A saturated water vapor atmosphere is necessary to prevent the escape of moisture from the test loaves during baking. Undue moisture loss has the consequence of obtaining loaves with a cracked crust which are then unsuitable for further quality examinations. Generally, the baking process is as follows. The oven is heated up to a given temperature (baking temperature), then by opening the oven door the already prepared (kneaded, formed) test loaves are fed into the oven. Four to eight test loaves may be baked simultaneously, and mostly an externally manually rotatable baking tray is used on which the loaves are placed consecutively.

As far as possible, the dough introduced into the heated baking space ought to pass immediately into a saturated water vapor atmosphere to avoid evaporation loss, but this cannot be achieved when the oven door is opened during the introduction of the loaves.

Reckoned from the beginning of the baking, the first 1–1.5 minutes of the baking process can be regarded as critical since it is during that period that the crust is formed, while thereafter, owing to the presence of the crust, the evaporation loss rate is smaller.

In known oven types the maintenance of a saturated water vapor atmosphere is effected by using evaporating vessels containing water in the baking space. The vessel is heated either by the heat present in the oven or by a heating element specially built in for this purpose. In both cases, evaporation usually commences during the heating up stage, and thus by the time of dough introduction, a saturated atmosphere is already present. However, this atmosphere is deleteriously affected by the opening of the door; also condensation of the water vapor may occur which is an undesirable phenomenon. Following locking of the door after feeding in the test loaves, evaporation recommences and the atmosphere in the baking space again approaches the dew-point, but precisely in the initial, critical period of baking the saturated water vapor atmosphere is not available.

It is therefore an aim of this invention to seek to provide a saturated water vapor atmosphere in the baking space of an oven substantially immediately on closing the oven door after feeding in the loaves to be baked.

The oven for baking, especially test baking, according to the invention provides that after introduction of the loaves and closing the oven door — through a pipe and vessel system forming an integral whole with the oven — a predetermined quantity of water is passed to a heating plate, which quantity is defined in functional relationship with the dew-point associated with the desired baking temperature, whereupon the said quantity of water substantially immediately becomes steam and ensures the presence of a saturated water vapor atmosphere in the baking space of the oven. Expediently, the in-feeding of water is controlled directly or indirectly in response to or by the closure of the oven door.

Since the time taken to introduce the loaves into the oven greatly influences the baking conditions, it has become necessary to accelerate the movement of the baking tray (plate) during introduction. Here it must be borne in mind that each of the test samples must dwell in the baking space for the same length of time, since differing baking times will considerably spoil the comparability of the tests. Although the introduction sequence of the individual loaves could be observed at the removal stage also, and thus the above conditions could be approached, it is highly desirable to make this operation independent of individual human ability and possible error.

This task is solved by an automatic electronic system which ensures by push-button operation that the individual segments of the baking tray are rapidly and positively located in front of the door. Thus the operator is only occupied with the introduction (or removal) of the loaves. With the aid of the automatic system, any one segment can be set in the front of the door in any desired sequence.

The invention is described below with reference to a preferred embodiment shown in the accompanying diagrammatical drawing, the two views of which respectively represent a partly broken-away elevation and a section of the baking oven of this invention.

The baking oven shown in the drawing is cylindrical and has a double wall filled with insulation 5. Within the inner wall a hermetically sealed baking space 2 is defined. The baking space 2 has lower and upper closure plates 1 which are simultaneously heating plates 1 also, and in the illustrated configuration ensure a substantially uniform temperature distribution in the baking space 2. A rotary shaft 3 of a driving motor 7 is passed through a seal in the lower heating plate 1 and the shaft 3 extends into the baking space 2 to rotate a reel-type baking plate 4 for supporting the loaves during baking and consisting of segments or paddles, the rotation of which tends to help in establishing the desired heat distribution. During baking the baking plate 4 is rotated. An automatic position switch 13 with a preselector system serves to accelerate the introduction and removal of the test material by ensuring that the segment or paddle of the plate 4 bearing the desired test sample is aligned with the centre line of a sealingly closing door 6 formed in the mantle surface of the oven.

A water feed unit 8 serves to ensure a saturated water vapor atmosphere in the oven, with the aid of which unit water can be fed to the lower heating plate 1, the amount of which is determined in the knowledge of the prevailing temperature. A suitable chart (not shown) may be provided on or adjacent the oven, correlating the desired baking temperature, the corresponding dew-point and the appropriate amount of water to be passed. Before starting the introduction of one or more test loaves into the oven, the water is passed from a storage vessel 14 to a graduated vessel 15 whence it falls on the heating plate via a valve in the unit 8 in response to closing the door after introduction of the loaves, and there it evaporates to steam. By means of the above-mentioned valve, removal of the steam may be effected after termination of the baking.

For ensuring the desired baking temperature, a temperature sensor 12 for the baking space 2, a temperature setter 10 and a temperature regulator 11 provided with an indicating instrument are provided, as shown. To introduce the test material and to monitor it during baking, the door 6 is transparent. Monitoring during baking is facilitated by internal lighting, not shown.

We claim as our invention:

1. A baking oven for baking crust-forming articles of food from dough, comprising a double-walled casing defining a baking chamber therein, heating means positioned in the baking chamber for establishing a preselected baking temperature therein, a sealingly closable door for the casing, the door being of double-walled construction, a support member in the baking chamber for receiving and supporting a said article in an unwrapped state, a vessel located externally of the baking chamber for containing an amount of water which, when vaporized, will establish a saturated water vapor atmosphere in the baking chamber, piping having an inlet end connected to the vessel and an outlet end arranged above the heating means in the baking chamber, and control means arranged in response to closure of the door after the support member has received a said article to be baked to pass said amount of water from the vessel through the piping directly on to the heating means to be immediately evaporated thereby and to establish said saturated water vapor atmosphere for a length of time sufficient at least to form a crust on said article.

2. A baking oven according to claim 1 wherein temperature sensing and regulating means are provided for maintaining the desired baking temperature in the oven.

3. A baking oven according to claim 1 wherein the baking chamber is substantially cylindrical, the heating means being constituted by two heating elements defining a part of the baking chamber.

4. A baking oven according to claim 1 wherein a rotary reel having a plurality of segments constitutes said support member, a rotary drive shaft being sealingly passed through the casing and connected to drive the reel, and automatic reel segment position control means for preselectably controlling the arrest position of the reel to bring any desired segment thereof into a predetermined position relative to the door.

* * * * *